(12) United States Patent
Bosis et al.

(10) Patent No.: US 10,371,303 B2
(45) Date of Patent: Aug. 6, 2019

(54) RETENTION AND SAFETY DEVICES FOR HOSES

(71) Applicant: Raffaello Bosis, Inverno E Monteleone (Pavia) (IT)

(72) Inventors: Raffaello Bosis, Inverno E Monteleone (IT); Alessandro Bosis, Inverno E Monteleone (IT)

(73) Assignee: Raffaello Bosis, Inervo E Monteleone (IT)

( * ) Notice: Subject to any disclaimer, the term of this patent is extended or adjusted under 35 U.S.C. 154(b) by 0 days.

(21) Appl. No.: 15/267,784

(22) Filed: Sep. 16, 2016

(65) Prior Publication Data

US 2017/0082232 A1    Mar. 23, 2017

(30) Foreign Application Priority Data

Sep. 18, 2015    (IT) .......................... 102015000053085

(51) Int. Cl.
| *F16L 55/00* | (2006.01) |
| *F16L 3/14* | (2006.01) |
| *F16L 3/16* | (2006.01) |
| *F16L 35/00* | (2006.01) |

(52) U.S. Cl.
CPC ............... *F16L 55/005* (2013.01); *F16L 3/14* (2013.01); *F16L 3/16* (2013.01); *F16L 35/00* (2013.01)

(58) Field of Classification Search
CPC ..... F16L 55/05; F16L 3/14; F16L 3/16; F16L 35/00

USPC ............ 24/115 K, 122.3, 122.6, 128, 135 R, 24/135 A, 136 R, 136 K, 115 F, 298; 248/925; 285/114

See application file for complete search history.

(56) References Cited

U.S. PATENT DOCUMENTS

| 345,675 | A | * | 7/1886 | Ethridge | ................. F16G 11/04 |
| | | | | | 24/136 R |
| 421,328 | A | * | 2/1890 | Straohbach | ............. F16G 11/04 |
| | | | | | 24/136 R |
| 874,417 | A | * | 12/1907 | Moss | ..................... F16G 11/00 |
| | | | | | 403/209 |

(Continued)

FOREIGN PATENT DOCUMENTS

| DE | 102007046061 A1 | 4/2009 |
| DE | 10 2013 004 326 A1 | 10/2013 |

*Primary Examiner* — Terrell L McKinnon
*Assistant Examiner* — Michael McDuffie
(74) *Attorney, Agent, or Firm* — Vorys, Sater, Seymour and Pease LLP

(57) ABSTRACT

Provided is a retention and safety device for hoses including a connection end engageable to a fixed point of a system. The device may include: (1) a rope defining a main extension trajectory and including an engagement portion; (2) a coupling end secured to the rope and connectable to the fixed point; and (3) an engagement end connectable to the hose and including the engagement portion of the rope and a rope guide bushing slidingly constrained to the rope and enclosing at least two portions distant along the main extension trajectory and mutually juxtaposed to the rope. The engagement portion may be substantially continuous and define a complete turn making, by means of a fast knot, an engagement loop in use around the hose, so that the engagement portion can wind around the hose irreversibly clenching along the same if the device is placed in traction.

15 Claims, 5 Drawing Sheets

(56) References Cited

U.S. PATENT DOCUMENTS

| | | | | |
|---|---|---|---|---|
| 1,572,771 A * | 2/1926 | Connelly | | B60D 1/187 24/129 R |
| 3,672,006 A * | 6/1972 | Fidrych | | F16G 11/02 24/115 N |
| 3,702,709 A * | 11/1972 | Shaffer | | F16G 11/146 24/115 K |
| 3,859,692 A * | 1/1975 | Waterman | | F16L 55/005 24/300 |
| 4,317,257 A | 3/1982 | Engel | | |
| 4,358,212 A * | 11/1982 | Compton | | F16G 11/146 24/115 K |
| 4,455,717 A * | 6/1984 | Gray | | F16G 11/14 24/115 M |
| 4,549,332 A * | 10/1985 | Pouliot | | F16L 55/005 24/115 H |
| 5,133,583 A * | 7/1992 | Wagman | | G02B 6/4439 24/122.3 |
| 5,229,178 A * | 7/1993 | Zemitis | | A63B 5/16 100/1 |
| 5,369,849 A * | 12/1994 | De France | | F16G 11/048 24/115 M |
| 5,950,284 A * | 9/1999 | Persson | | B60P 7/0823 24/115 K |
| 6,260,241 B1 * | 7/2001 | Brennan | | F16G 11/00 24/115 K |
| 6,839,942 B1 * | 1/2005 | Spearing | | F16G 11/14 24/115 M |
| 7,536,756 B2 * | 5/2009 | McLoughlin | | A62C 33/04 224/572 |
| 7,802,823 B2 * | 9/2010 | Piantoni | | F16L 55/005 285/114 |
| 8,630,523 B2 * | 1/2014 | Smith | | G02B 6/4465 385/113 |
| 2002/0163184 A1 * | 11/2002 | Blair | | F16B 2/26 285/114 |
| 2007/0252385 A1 * | 11/2007 | Piantoni | | F16L 55/005 285/114 |
| 2011/0226527 A1 * | 9/2011 | Ritchie-Bland | | F16L 1/123 174/669 |
| 2012/0080650 A1 * | 4/2012 | Davidson | | H02G 1/081 254/134.3 FT |
| 2013/0248004 A1 * | 9/2013 | Money | | F16L 55/005 137/15.08 |
| 2013/0341470 A1 * | 12/2013 | Lee | | F16L 55/005 248/68.1 |
| 2014/0217761 A1 * | 8/2014 | Bond, Jr. | | F16L 55/005 294/74 |
| 2015/0026930 A1 | 1/2015 | Schmitz | | |
| 2018/0224025 A1 * | 8/2018 | Harris | | F16L 3/02 |

\* cited by examiner

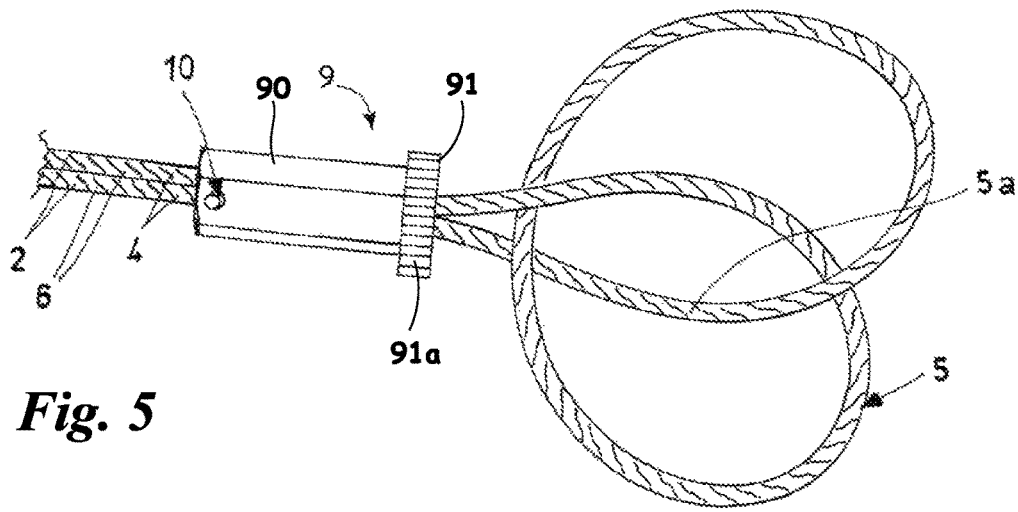
Fig. 5
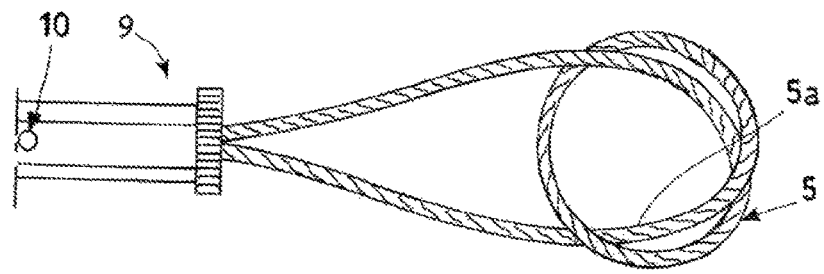
Fig. 6
Fig. 7
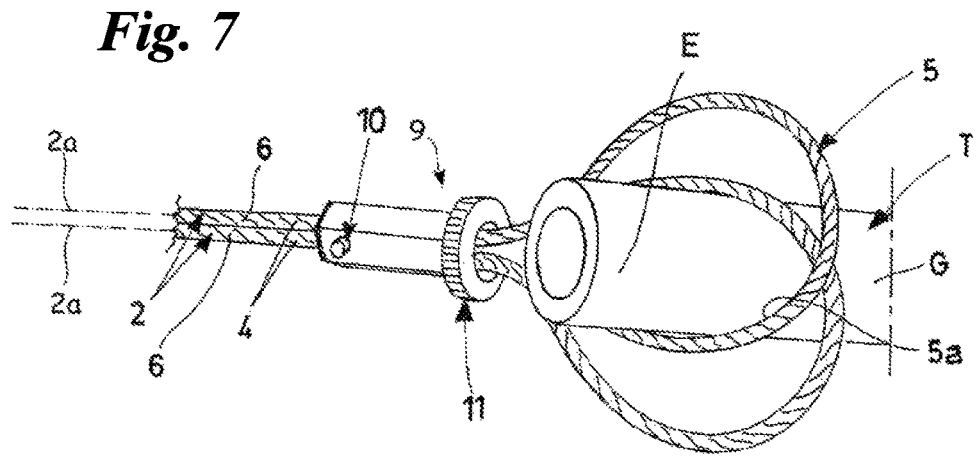

RETENTION AND SAFETY DEVICES FOR HOSES

TECHNICAL BACKGROUND OF THE INVENTION

The present invention relates to a retention and safety device for hoses of the type as recited in the preamble of the first claim.

Retention and safety devices for hoses supplied with high pressure liquids, in particular for hydraulic machines or systems or high pressure fluids in circulation, are known of.

DESCRIPTION OF THE PRIOR ART

Said hoses are connected to respective supply flanges and said retention and safety devices prevent the aforesaid hoses from disconnecting from the respective fittings or from the respective supply or use flanges of pressurised fluids.

In detail, the retention and safety devices are designed to stop the travel of the hoses when they accidentally disconnect from the respective fittings or supply flanges, thus avoiding the dangerous "whiplash effect," that is to say the uncontrolled "whipping" movement of the hoses when accidentally disengaged from the respective fittings or from the respective supply or use flanges of pressurised fluids.

Retention and safety devices comprise a connection chain or cable connected to a coupling end predisposed to engage a fixed portion, such as a supply flange or the like, and an engagement end, opposite the coupling end, predisposed to engage a hose.

The engagement end comprises a hose clamp suitable to be fitted and tightened on the respective hose to anchor to the respective fitting or the respective supply or use flange of pressurised fluids, a similar solution is described in the patent application WO2006/100702. In order to prevent the hose clamp from slipping off the hose when the latter accidentally disengages from the respective fitting or the respective supply or use flange of pressurised fluids, the hose clamp is fitted with a special gasket that increases the friction between the latter and said hose and a jamming plate which has the function of cutting into the covering sheath of the hose between the end of the latter disengaged from the respective fitting or the respective supply or use flange of pressurised fluids and said clamp.

Other similar devices are described in the patent documents US-A-2015/026930, U.S. Pat. No. 4,549,332 and DE-A-10200704606.

US-A-2015/026930 describes a locking device comprising a cable suitable to form substantially an engagement loop or sling for elements such as pressure hoses, in which the sling comprises inside it two separate, distant sections of the cable constrained inside a sleeve. The sleeve consists of two portions mutually movable by screwing, which make it possible to tighten or open the engagement loop and then tension the cable so as to increase or reduce the grip on the possible object placed inside the engagement portion.

U.S. Pat. No. 4,549,332 describes a safety device for pipes for the passage of pressurised fluid comprising a flexible cable substantially defining two engagement loops at opposite ends of the cable and comprising three rigid rings movable along the extension of said cable. The central movable ring is bound to a second rope ending with a safety hook, while the lateral movable rings define, by translating, the opening of the engagement loops at the ends.

Lastly elastic means, such as two springs exert a force on the movable rings such as to increase or reduce the diameter of the loops and thereby enable the release or increase the grip of the engagement loops for tubes of variable diameter.

DE-A-102007046061 describes a safety device for a flexible line comprising a stop cable connected, on the two opposite ends, to a retention portion placed on a fitting for example of a machine. Furthermore the device comprises a rigid ring or locking clamp lying on the hose and comprising a plate, constrained on its outer surface, including a hole through which the cable passes. The ends of the cable go through the hole and roll up circling around the hose.

However, when a pressure hose disengages accidentally from a respective fitting or supply flange, it is moved quickly with an extremely strong force and with continuous accelerations in different directions. These stresses, also exerted in unfavourable directions, may damage the clamp or the plate and may thus disengage the engagement end from the flexible hose leaving it free to move.

In particular, the transversal stresses induce extensive damage in the known devices and are also critical as regards the devices described in the previously mentioned patent applications.

The malfunction of the connection of the retention device through the clamp allows the hose to move in an uncontrolled manner, with a great risk for objects or people nearby.

It should also be noted that the retention devices for example with a hose clamp are ill-suited to adapt to hoses and fittings or supply or use flanges of pressurised fluids of different sizes so that a stock of components (clamps and/or perforated plates) of different shapes and sizes is needed, each dedicated to a specific hose and/or fitting/flange.

As regards the aforementioned documents, the patent application US-A-2015/026930 describes a device including a sleeve having a complex structure and therefore expensive to produce. Moreover, the conformation of the gripping loop means that cables with a larger diameter cross-section must be used to meet the need for high tensile strength in the face of the more demanding tasks, resulting in greater overall dimensions and greater rigidity of the cable.

A solution of this type is therefore ill-suited to hoses of a smaller diameter.

In addition, the locking system comprised inside the sleeve consists of a peg which constrains the cable ends defining the engagement loop so as to lock the device onto the hose. This locking is, however, an impediment which reduces the device's performance against the whiplash effect. In fact, the engagement loop tends to close and tighten around the tube with greater difficulty or the peg, if excessively tightened, constitutes a real impediment to the proper closure of the engagement loop.

The devices described by U.S. Pat. No. 4,549,332 and DE-A-10200704606 instead have limited performance systems that do not allow a stable tensioning of the cable in the case of the whiplash effect.

In particular, once the whiplash is triggered, neither of the devices facilitate the tightening of the engagement loops around elements such as hoses and therefore does not guarantee high performance in the face of high loads.

Moreover, they are complex systems, consisting of a plurality of elements in even higher number, for example, than said first patent application US-A-2015/026930 presented.

SUMMARY OF THE INVENTION

In this situation the technical purpose of the present invention is to devise a retention and safety device for hoses able to overcome at least partially the drawbacks mentioned above.

Within the sphere of said technical purpose one important aim of the invention is to ensure the constraint between the hoses and the fixed points of a system, when said hoses disengage from the respective fixed points.

Another purpose of the present invention is to provide a retention and safety device adaptable to different sizes and shapes of hoses and fittings or supply or use flanges of pressurised fluids without losing in terms of performance, for example for high loads.

It is also an object of the present invention to increase the performance of the retention and safety devices but with an assembly and installation process which is nevertheless simple and quick.

The aforementioned purposes and others yet are substantially achieved by a retention and safety device for hoses as set forth and described in the following claims.

The technical purpose and specified aims are achieved by a retention and safety device for hoses of the type comprising at least one connection end engageable to a fixed point of a system, the retention and safety device comprising: at least one rope defining a main extension trajectory, comprising an engagement portion, a coupling end secured to the rope, and connectable to the fixed point, an engagement end secured to the hose and comprising: the engagement portion of the rope, and at least one rope guide bushing slidably constrained to the rope and enclosing at least two portions distant from each other along the main extension trajectory and mutually juxtaposed to the rope, the engagement portion is continuous and substantially defines at least one complete turn making, by means of at least one fast knot, an engagement loop in use around the hose, so that the engagement portion can be coiled around the hose, and clench irreversibly along the same if the retention and safety device is placed in traction.

BRIEF DESCRIPTION OF THE DRAWINGS

The characteristics and advantages of the invention are clearly evident from the following detailed description of preferred embodiments thereof, with reference to the accompanying drawings, in which:

FIG. 5 is a representation of a detail of the retention and safety device illustrated in FIG. 1, in a condition of non-use;

FIG. 6 is a further representation of a detail of the retention and safety device illustrated in FIG. 1, in a condition of non-use;

FIG. 7 is a representation of a detail of the retention and safety device illustrated in FIG. 1, in a first condition of use;

DESCRIPTION OF THE PREFERRED EMBODIMENTS

Figure 1:
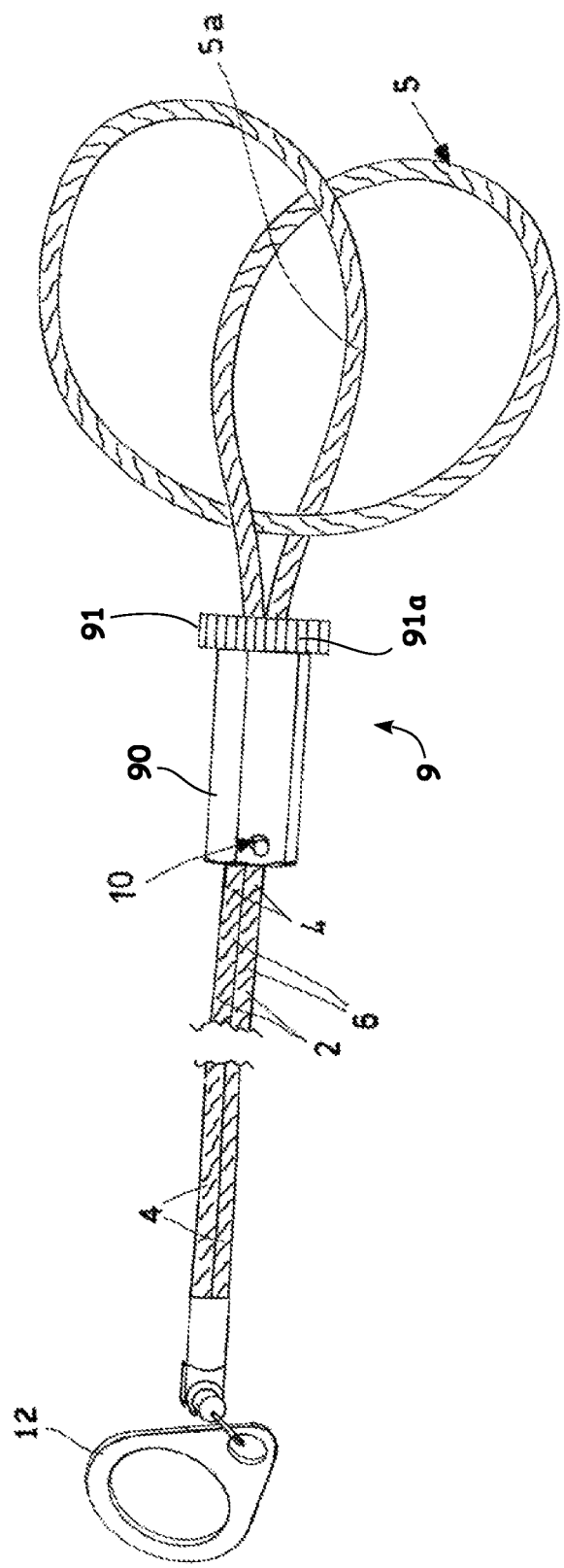
FIG. 1 is a representation of a retention and safety device for pressurised hoses.
Figure 2:
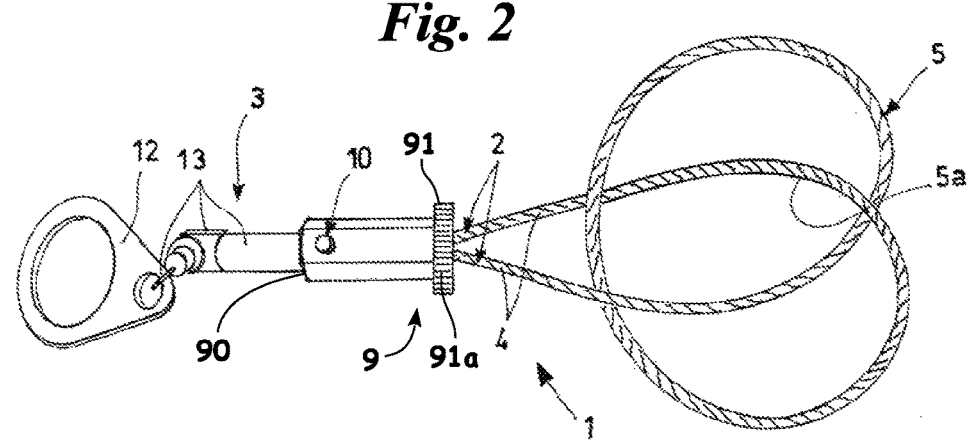
FIG. 2 is a representation of the retention and safety device for pressurised hoses according to a first embodiment of the present invention, shown in a condition of non-use.
Figure 3:
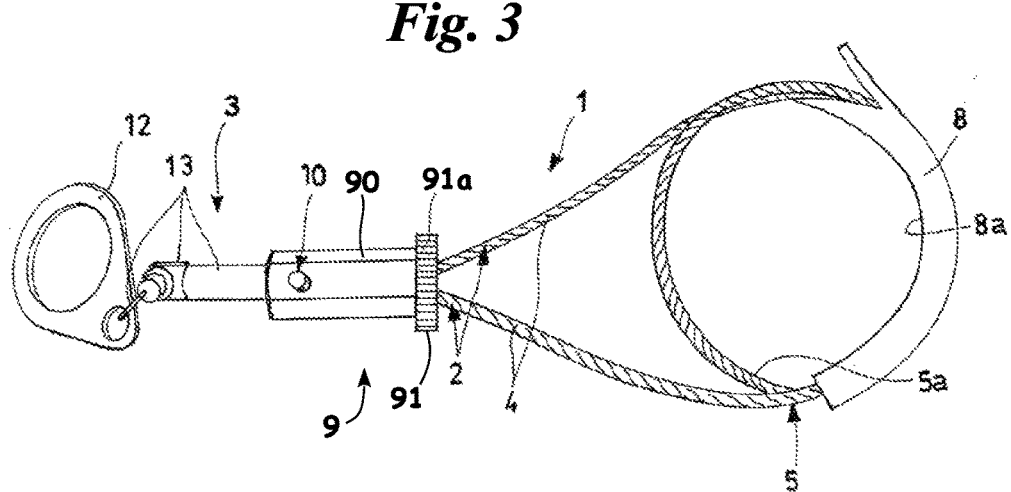
FIG. 3 is a representation of the retention and safety device in FIG. 1, illustrated in preparation for its application to a supply or use hose of pressurised fluids.
Figure 4:
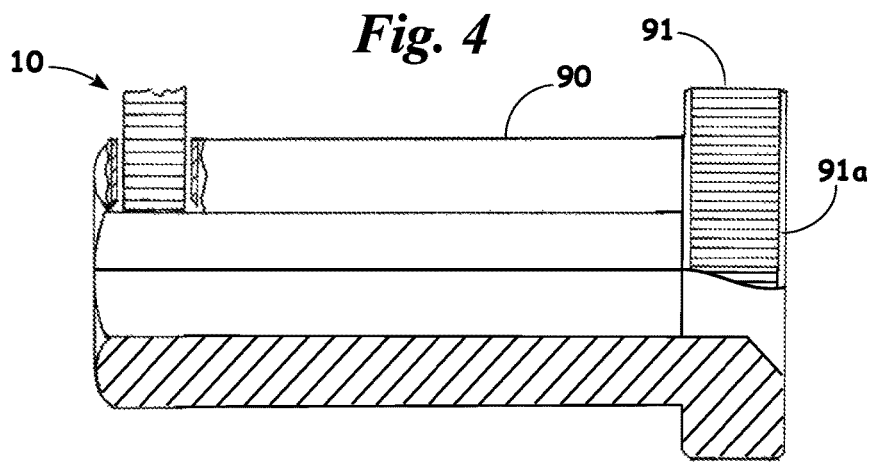
FIG. 4 is a representation partially in view and partially in cross-section of a detail of the retention and safety device illustrated in the previous figures.
Figure 8:
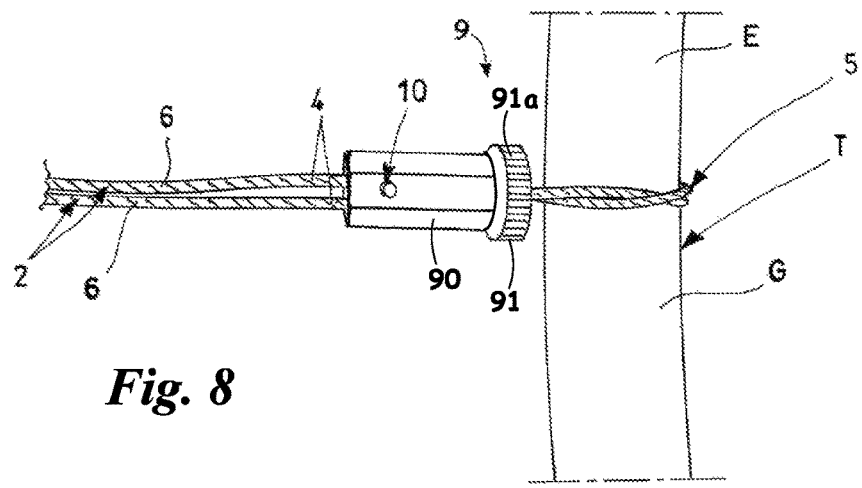
FIG. 8 is a representation of a detail of the retention and safety device illustrated in FIG. 1, in a second condition of use.
Figure 9:
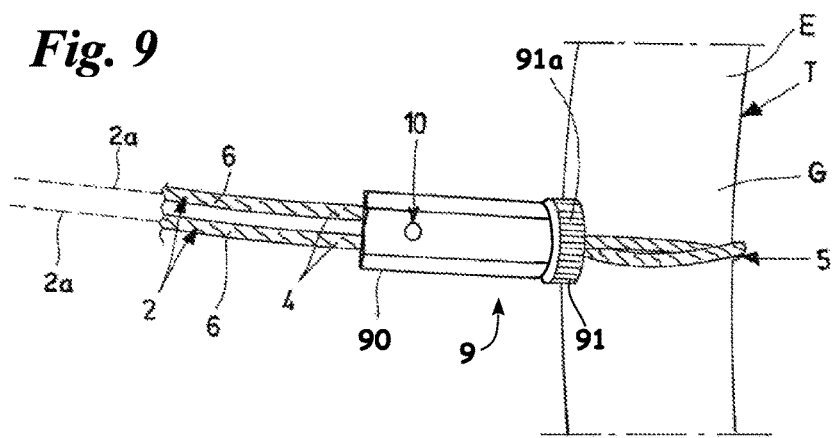
FIG. 9 is a representation of a detail of the retention and safety device illustrated in FIG. 1, in a third condition of use.
Figure 10:
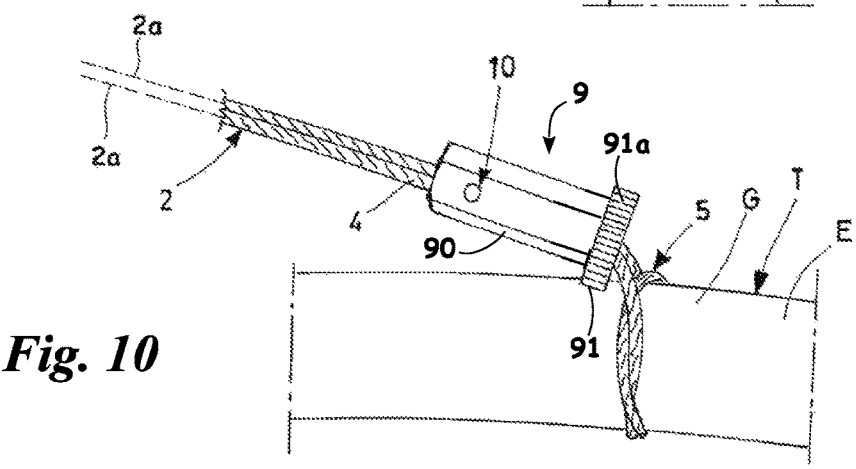
FIG. 10 is a representation of a detail of the retention and safety device illustrated in FIG. 1, in a fourth condition of use.

Herein, the measures, values, shapes and geometric references (such as perpendicularity and parallelism), when used with words like "about" or other similar terms such as "approximately" or "substantially", are to be understood as except for measurement errors or inaccuracies due to production and/or manufacturing errors and, above all, except for a slight divergence from the value, measure, shape or geometric reference which it is associated with. For example, said terms, if associated with a value, preferably indicate a divergence of not more than 10% of said value.

In addition, where used terms such as "first", "second", "upper", "lower", "main" and "secondary" do not necessarily refer to an order, a priority relationship or relative position, but may simply be used to more clearly distinguish different components from each other.

With reference to said drawings, reference numeral 1 globally denotes the retention and safety device for pressurised hoses.

The retention and safety device 1 is predisposed to connect hoses T. Such hoses T may for example comprise an outer cover sheath G or may be bare.

Preferably they have at least one connection end E engageable to a fixed point of a system.

For example, the fixed point may be a fitting or supply or use flange of pressurised fluids, with varying diameters, such as for example those used for making hydraulic circuits or underwater destined to the transit of one or more gases.

The retention and safety device 1 preferably comprises at least one rope 2 defining a main extension trajectory 2a, a coupling end 3 and an engagement end 4.

The main extension trajectory 2a is preferably defined by a mean line of the rope 2 and, therefore, may correspond to a curved line that may intertwine at possible knots. The main extension trajectory 2a also defines perpendicular planes, perpendicular to said trajectory 2a.

The coupling end 3 is preferably connectable to a fixed point of a system and may for example comprise said rope 2 or may comprise other connecting elements such as ends, turnbuckles or loops of the flexible or rigid type.

The engagement end 4 is preferably connectable to a flexible hose T engageable in turn to the fixed point and is preferably composed of at least two ends of the rope 2.

The device 1 is preferably also provided, at the coupling end 3 with at least one perforated plate 12 for example able fitting onto the fitting or supply or use flange of the pressurised fluid.

Within the coupling end 3, for example between the perforated plate 12 and the rope 2, different intermediate connection components 13 may be interposed which may vary in structure, shape and dimensions as needed and other components provided for.

Preferably the intermediate connection components 13 comprise a rigid bar fixed to the rope 2, but may also be threaded ends, turnbuckles, rope loops or more in general rings suitable to restrain, for example, two distinct ends of the rope 2.

The rope 2 is preferably made from a single wire-like structure, preferably a flexible cable of twisted threads, even more preferably a flexible, multi-strand metal cable. In particular, for example, the rope comprises a small diameter multi-strand composed of at least 84 twisted threads, preferably 133 threads, to ensure a better operation even for tight bending radii.

Alternatively the rope 2 may be composed of a plurality of portions of rope mutually connected.

The rope 2 also comprises an engagement portion 5, preferably in one piece with said rope and arranged at the engagement end 4.

The engagement end 4 advantageously comprises at least an engagement portion 5 joined to the engagement end of the rope 2 to tighten the hose T and keep the latter constrained to a fixed point of a system even after the accidental disengagement of the hose T.

The engagement portion 5 is configured to increase the narrowing of the hose T when the latter disengages and moves away from the fixed point. In other words the throttling element 5 acts externally on the hose T squeezing more and more when, for example as a result of an accidental disconnection, the hose tube moves away suddenly from the fixed point.

Preferably, the engagement portion 5 is continuous and defines at least one full turn and preferably at least two turns realising at least one simple fast knot, in use around said hose T, so that said engagement portion 5 coils around the hose T or the outer covering sheath G and tightens its grip along the same if the retention and safety device 1 is placed in traction.

The above simple knot can be tightened or loosened as needed and, for example, narrows more when the hose T, disengaging from the respective fixed point of the system, moves away. The engagement portion 5 thus delimits at least one engagement loop 5a defined by the knot and fitting on a respective hose T to be constrained to a corresponding fixed point.

The simple knot made on the flexible metal cable forming the rope 2 and thus preferably the engagement portion 5 may be obtained according to different types of knotting.

According to the embodiments shown in the figures, the simple knot made to define the engagement portion 5 preferably provides that the rope 2 winds having at least two intersection points in which the same overlaps on itself as it extends substantially along a circumference that circumscribes the hose T to anchor to the respective fitting or the respective supply or use flange of the pressurised fluid.

In particular this type of configuration gives the retention and safety device 1 for pressurised hoses 1 a self-locking effect which occurs automatically as a result of the disengagement of the hose T from the respective fitting or from the respective supply or use flange of the pressurised fluid: the rope 2 undergoes a tensioning that directly induces a narrowing of the engagement loop 5a.

It should be noted that the throttling element 5 may also be defined by other types of knots not represented and described in the present description, able however to throttle with a self-locking effect the hose T when the latter is disengaged and moves away from the corresponding fixed point of a system.

Moreover, alternatively to the perforated plate 12, the coupling end 3 of the rope 2 comprises at least a second engagement portion, for example defined by the same rope placed continuously within the entire device 1, suitable to tighten at least a portion of the fixed point. The second engagement portion of the coupling end 3 may thus be configured to increase the throttling of the portion of the fixed point on which it is engaged when the hose T disengages and moves away from said fixed point.

Similarly to the engagement portion 5 of the engagement end 4, the second engagement portion of the coupling end 3 may comprise a second simple knot achievable according to any knotting which operates like a noose around the engagement portion of the fitting or of the supply or use flange of the pressurised fluid, when, by effect of the detachment of the hose T, the anchor rope 2 is tensioned.

The rope 2, engagement portion 5 and second engagement portion preferably being made from said flexible cable which is appropriately woven to define said engagement portions, the rope 2 has at least two branches 6 of rope 2 which extend next to each other between the engagement end 4 and the coupling end 3 and are for example joined in some points by corresponding joins suitable to keep the two branches close to each other.

The engagement portion 5, instead, may be provided with at least a sheath 8, preferably of a substantially tubular shape, which has at least a contact portion 8a predisposed to lie inside the engagement loop 5a so as to remain interposed between the respective hose T and the engagement portion 5 when it is tightened on the latter. The sheath 8 is for example a component made of polymeric material, more preferably a thermoplastic polymeric material, suitable to promote the self-locking and shrinking effect of the throttling element 5 while keeping the rope portions 2 defining the engagement loop 5a substantially together.

The device 1 benefits from the presence of the sheath 8, but does not need the same to fulfil its functions even in the case of elevated whiplash effects.

Furthermore, the rope guiding sheath 8 may comprise markings containing technical details useful to the person skilled in the art, for example, to recognise the diameters of use and distinguish them from possible other devices of the same type, but with different working diameters.

According to an advantageous aspect of the present invention, the device 1 preferably comprises at least one rope guide bushing 9 slidingly constrained to the rope 2 and enclosing for example at least two distant portions, i.e. non-adjacent, along the main extension trajectory 2a, and mutually juxtaposed, of said rope 2.

For example, the rope guide bushing 9 is suitable to tighten or loosen the engagement loop 5a of the engagement portion 5.

In detail, the rope guide bushing 9 tightens for example the engagement loop 5a of the throttling element 5 when, engaging the latter, it slides on the rope 2 substantially along the main extension trajectory 2a away from the coupling end 3 towards said engagement portion 5.

Conversely, when the rope guide bushing 9 disengages the throttling element 5 sliding along the rope 2 away from the engagement end 4 it allows the loosening of the engagement loop 5a.

Advantageously, the rope guide bushing 9 comprises at least one locking dowel 10, preferably a threaded locking dowel 10a, which can be switched between an unlocked condition, in which it allows the rope guide bushing 9 to slide along the thread-like structure of the rope 2 and a locking condition, in which it interacts with the thread-like structure of the rope 2 to firmly hold the rope guide bushing 9 on the latter preventing the sliding thereof.

In detail, the rope guide bushing 9 is preferably substantially a hollow body comprising a through hole suitable to accommodate at least two distinct portions of the rope 2, for example of tubular shape, comprising a portion having a smaller cross-section called shank 90 and a portion having a greater cross-section called head 91.

In particular, the shank 90 may have varying shapes in cross-section. For example, it may have a perforated hexagonal or perforated octagonal or even perforated cylindrical cross-section. The head 91, like the shank 90, may have different shapes.

The head 91 preferably further comprises a gripping portion 91*a*, preferably a gripping ring nut or corrugated surface, suitable to ensure good friction when the gripping portion 91*a* is in contact with another surface. The gripping portion 91*a* enables the rope guide bushing 9 to perform an important function.

The gripping portion 91*a* in fact enables the rope guide bushing 9 to establish a high tension of the rope 2 through a leverage effect that is generated as a result of rotation of the bushing 9 around the gripping portion 91*a*.

The rope guide bushing 9 fact harpoons the outer surface of the hose T and acts as a lever of which the rotation hinge or pin is defined by the point of contact between said head 91 and the outer surface of the hose T corresponding to the gripping portion 91*a*.

Following disengagement of the hose T with respect to the fixed point of the system the rope guide bushing 9 is inclined preferably by an angle of about 90° so as to align the main extension trajectory 2*a* of the rope 2 passing through it internally with the main direction of extension of the hose T.

This alignment makes it possible to tension the rope 2 to the maximum and to tighten the engagement loop 5*a* increasing the grip to the point of irreversibly clenching the throttling element 5 to the hose T.

In fact the tension is advantageously such as to impart a force on the rope 2 thanks to which the latter can, under high whiplash loads, penetrate the outer surface of the hose T.

The previously described functioning is for example shown in FIGS. 7-10.

Therefore, starting from the latter considerations, it is clear that the device 1 allows a synergistic tensioning of the engagement portion 5 of the rope 2, with a narrowing of the engagement loop 5*a*, to which both the configuration of the engagement portion 5, in particular preferably comprising at least two intersections of rope 2, and the rope guide bushing 9 in rotation to create a leverage effect on the hose T, contribute.

The rope guide bushing 9 is, as said, preferably in one piece. However the rope guide bushing may be composed for example also by two or more portions secured to each other. For example, the head 91 may be screwed or assembled to the shank 90, or the head 91 may consist of a screw housed inside the shank 90, so that it can be replaced with a head 91 of larger size to improve the efficacy of the leverage effect described below. Said leverage effect can be improved by distancing the head 91 from the shank, for example by unscrewing the head from the shank, and moving the head 91 towards the hose T.

In general, the rope guide bushing 9 may have various embodiments provided that the leverage effect for the tensioning of the rope 2 is guaranteed.

Figure 11:
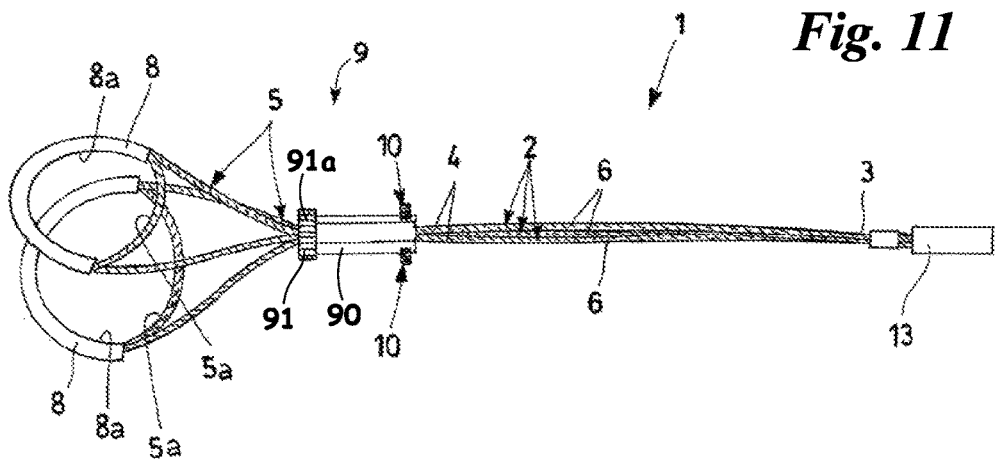
FIG. 11 is a second embodiment of a retention and safety device for pressurised hoses according to the present invention.
Figure 12:
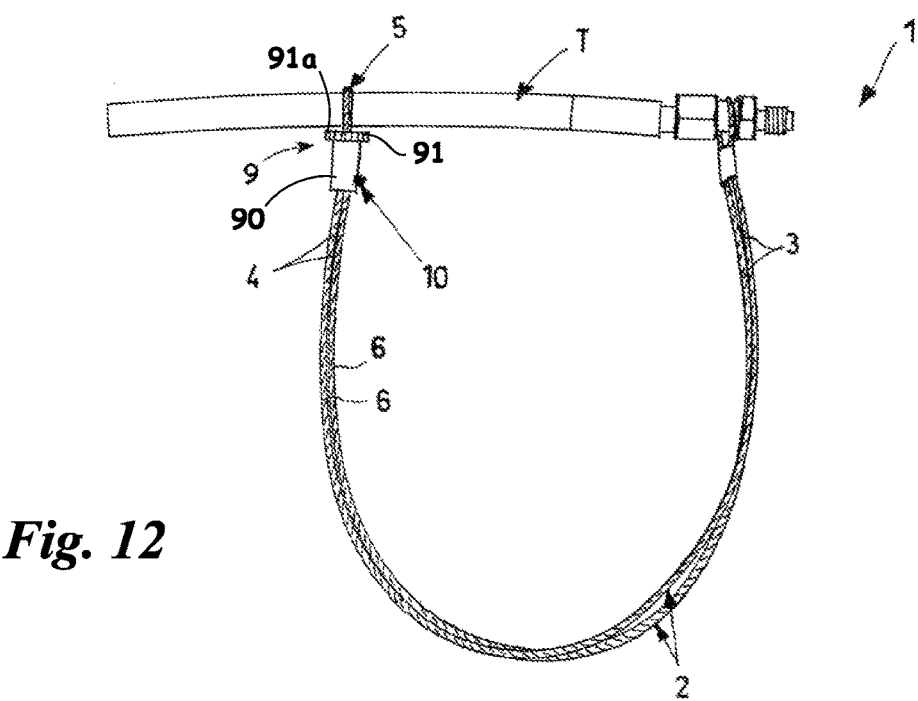
FIG. 12 is a third embodiment of a retention and safety device for pressurised hoses according to the present invention.

According to the embodiment shown in FIG. 11, the retention and safety device 1 comprises at the engagement end 4 two ropes 2 appropriately placed side by side to double the number of engagement portions 5 acting on the hose T.

The fixing of the retention and safety device 1 to the hose T is easily performed by first fitting the engagement loop 5*a* of the engagement portion 5 of the engagement end 4 on the latter, then tightening the engagement loop 5*a* by sliding the rope guide bushing 9 towards the engagement portion 5 and the hose T.

Once the hose T has been tightened by the sliding of the rope guide bushing 9, the latter is locked in this position by means of the locking dowel 10. Once the hose T has been anchored it can be coupled to the fixed point.

In the case in which the hose T disengages from the fixed point, it is irremediably distanced therefrom until it encounters the contrast of the retention and safety device. When this occurs, the retention and safety device 1 is tensioned inducing at least the engagement portion 5 to further clench the hose T due to the synergistic effect of the clenching given by the leverage effect generated by the rope guide bushing 9 aligned to the hose T, triggering the self-locking function of the simple knot.

In particular the gripping portion 91*a* hooks to the hose T acting as a fulcrum or rotation hinge of the lever constituted by the rope guide bushing 9.

This leverage adds synergistically a further contribution to the overall tensioning of the rope 2 of the device 1.

As a result, the engagement portion 5 and the leverage effect of the rope guide bushing 9 of the retention and safety device 1 in tension or taut due to the tensions given to the rope of said device 1 by the detachment of the hose T, determines a significant narrowing of the engagement portion 5 around the hose T and the consequent permanent locking of the knot thereon. In other words, the tensions exerted on the rope 2 of the retention and safety device 1 and the weave of said rope 2, at the engagement portion 5 which engages the hose T, concur so that the rope 2 tightens on the outer surface of the hose T or the sheath G to the point of cutting it, penetrating it at least partially to bind irreversibly to it.

Therefore the rope 2 has a substantially self-locking effect thanks to the intersection of portions of rope 2 resulting from the tensioning thereof following the dangerous detachment of the hose T, without the aid of other complex devices and substantially ensuring maintenance of the attachment position.

The object of the present invention resolves the problems found in the prior art and achieves important advantages.

First of all, the retention and safety device 1 according to the present invention is more reliable, in terms of safety, than the known devices, since the engagement portion 5 which clamps the pressurised hose T is able to actively act on the hose T clenching it more when it disengages and moves away from the respective fitting or supply or use flange of the pressurised fluid.

The retention and safety device 1 according to the present invention is not subject to any slippage of the hose T nor is it subject to breakage of components interposed between the hose T and the rope 2, since the engagement portion 5 is formed by the knotting or intertwining of the rope itself.

In addition, the ability of the engagement portion 5 to clench around the hose T, when the latter disengages from the fixed point of a system, tensioning the rope 2, ensures a stable engagement of the retention and safety device 1 to the free hose T so as to keep the latter secured, by means of the rope 2, to the fixed point.

It should also be noted that the engagement portion 5, and possibly also the second engagement portion, allows a reduction or even the elimination of all those components, such as for example connection plates or clamps or flanges, which must be provided made to measure for the respective application. In other words, the engagement portion 5 makes the retention and safety device universal so that it can be used on fittings, flanges or hoses of different sizes or shapes.

Of course, this feature advantageously permits a considerable reduction of the stocks dedicated solely to made to measure components.

Variations may be made to the invention without departing from the scope of the inventive concept defined in the claims.

In said sphere all the details may be replaced with equivalent elements and the materials, shapes and dimensions may be as desired.

The invention claimed is:

1. A retention and safety device for hoses having at least one connection end engageable to a fixed point of a system, said retention and safety device comprising: at least one rope defining a main extension trajectory, the rope being a flexible metal cable and comprising an engagement portion, a coupling end secured to said rope, and connectable to said fixed point, an engagement end connectable to said hose that comprises said engagement portion of said rope, and at least one rope guide bushing slidably constrained to said rope and enclosing at least two portions distant from each other along said main extension trajectory and mutually juxtaposed to said rope, wherein said engagement portion is continuous and substantially defines at least one complete turn making an engagement loop in use which makes one fast knot around said hose, so that said engagement portion can wind around said hose and irreversibly clench its grip along the same if said retention and safety device is placed in traction, wherein said fast knot comprises at least one simple knot, in which said rope is wound presenting at least two points of intersection in which the same overlaps on itself as it extends substantially along a circumference that circumscribes said hose.

2. The device according to claim 1, wherein said rope guide bushing comprises a shank and a head, said head comprising a gripping portion suitable to hook to said hose defining a point of contact and a rotation fulcrum for said rope guide bushing, said rope guide bushing being suitable to rotate around said point of contact with said hose defining a lever suitable to tension said rope of said engagement portion.

3. The device according claim 2, wherein said rope guide bushing is suitable to rotate around said point of contact by an angle equal to 90° when said hose disengages from said fixed point.

4. The device according to claim 1, wherein said rope is a multi-strand rope comprising a number of twisted wires greater than 84.

5. The device according to claim 1, wherein said engagement portion is provided with at least a sheath having at least a contact portion lying within said engagement loop in such a way such as to remain interposed between said hose and the engagement portion when it is tightened on said hose keeping the ends of said rope defining said engagement loop substantially in the condition of adhesion.

6. The device according to claim 1, wherein said narrowing slider is suitable to tighten or loosen said engagement loop of said engagement portion, said narrowing slider tightening said engagement loop of said engagement portion when it engages said engagement portion and slides on said rope away from said engagement end and allowing the loosening of said engagement loop of said engagement portion when it disengages the latter and slides along said rope away from said engagement end and said hose.

7. The device according to claim 1, wherein said narrowing slider comprises at least one locking member, preferably a thread locking dowel, switchable between an unlocking condition in which it allows said narrowing slider to slide along said rope and a locking condition, in which it interacts with said rope to firmly lock said narrowing slider on said rope preventing the sliding thereof.

8. The device according to claim 1, wherein said rope guide bushing comprises a shank and a head, said head comprising a gripping portion suitable to hook to said hose defining a point of contact and a rotation fulcrum for said rope guide bushing.

9. The device according to claim 1, wherein said rope guide bushing is suitable to rotate around said point of contact with said hose defining a lever suitable to tension said rope of said engagement portion.

10. The device according claim 1, wherein said rope guide bushing is suitable to rotate around said point of contact by an angle equal to 90° when said hose disengages from said fixed point.

11. The device according to claim 8, wherein said rope guide bushing is suitable to rotate around said point of contact by an angle equal to 90° when said hose disengages from said fixed point.

12. The device according claim 1, wherein at the coupling end there is at least one perforated plate for connection to said fixed point.

13. The device according to claim 1, wherein within the coupling end, between the perforated plate and the rope, an intermediate connection component is interposed attached to the perforated plate and the rope, the intermediate connection component comprising a rigid bar fixed to the perforated plate and the rope.

14. A retention and safety device for hoses having at least one connection end engageable to a fixed point of a system, said retention and safety device comprising:
   at least one rope defining a main extension trajectory, the rope being a flexible metal cable and comprising an engagement portion,
   a coupling end secured to said rope, and connectable to said fixed point,
   an engagement end connectable to said hose that comprises
      said engagement portion of said rope, and
      at least one rope guide bushing slidably constrained to said rope and enclosing at least two portions distant from each other along said main extension trajectory and mutually juxtaposed to said rope,
   wherein said engagement portion is continuous and substantially defines at least one complete turn making, by means of at least one fast knot, an engagement loop in use around said hose, so that said engagement portion can wind around said hose and irreversibly clench its grip along the same if said retention and safety device is placed in traction,
   wherein said rope guide bushing comprises a shank and a head, said head comprising a gripping portion suitable to hook to said hose defining a point of contact and a rotation fulcrum for said rope guide bushing, said rope guide bushing being suitable to rotate around said point of contact with said hose defining a lever suitable to tension said rope of said engagement portion.

15. The device according claim 10, wherein said rope guide bushing is suitable to rotate around said point of contact by an angle equal to 90° when said hose disengages from said fixed point.

* * * * *